United States Patent
Bury et al.

(10) Patent No.: US 7,831,747 B2
(45) Date of Patent: Nov. 9, 2010

(54) METHOD AND APPARATUS TO GENERATE A DATA DESCRIPTOR

(75) Inventors: Jim Bury, Chandler, AZ (US); Joseph Bennett, Roseville, CA (US); Mark Sullivan, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 1054 days.

(21) Appl. No.: 11/008,338

(22) Filed: Dec. 8, 2004

(65) Prior Publication Data

US 2006/0120372 A1 Jun. 8, 2006

(51) Int. Cl.
G06F 3/00 (2006.01)
G06F 15/16 (2006.01)
H04J 3/16 (2006.01)
H04J 3/22 (2006.01)
H04J 3/24 (2006.01)

(52) U.S. Cl. .................. 710/30; 370/470; 370/474; 709/236

(58) Field of Classification Search ............. 710/30; 370/470, 474; 709/236

See application file for complete search history.

(56) References Cited

U.S. PATENT DOCUMENTS

| | | | |
|---|---|---|---|
| 5,596,715 A * | 1/1997 | Klein et al. ............. | 714/43 |
| 6,167,032 A * | 12/2000 | Allison et al. ............. | 370/252 |
| 6,452,602 B1 * | 9/2002 | Morein ............. | 345/555 |
| 7,382,776 B1 * | 6/2008 | Chan et al. ............. | 370/389 |
| 2002/0150106 A1 * | 10/2002 | Kagan et al. ............. | 370/395.6 |
| 2003/0172177 A1 * | 9/2003 | Kersley et al. ............. | 709/236 |
| 2004/0260829 A1 * | 12/2004 | Husak et al. ............. | 709/232 |
| 2005/0128360 A1 | 6/2005 | Lu | |
| 2006/0050694 A1 | 3/2006 | Bury | |
| 2006/0050722 A1 | 3/2006 | Bury | |

OTHER PUBLICATIONS

Advanced Switching Core Architecture Specification, Rev. 1.0, published Dec. 2003.
PCI-Express Base Specification, Rev. 1.0a, published Apr. 15, 2003.

* cited by examiner

*Primary Examiner*—Niketa I Patel
*Assistant Examiner*—Farley J Abad
(74) *Attorney, Agent, or Firm*—Caven & Aghevli LLC

(57) ABSTRACT

Embodiments are generally direct to a method and apparatus to generate a data descriptor. In one embodiment, a data descriptor is generated for a block of data to be forwarded from a node to another node on a communication link. The data descriptor includes an indication to build a data packet containing at least a portion of the block of data in an accelerated or a non-accelerated manner.

19 Claims, 4 Drawing Sheets

METHOD AND APPARATUS TO GENERATE A DATA DESCRIPTOR

TECHNICAL FIELD

Embodiments of the invention generally relate to the field of electronic systems, and more particularly, to a method and apparatus to generate a data descriptor.

BACKGROUND

Communication networks may be constructed of packet switching channels which move data between endpoints (hereinafter referred to as "nodes") on one or more communication links. In order to move data to another node, a node may segment the data into one or more data packets. The one or more data packets are then forwarded to the other node.

To build a data packet, a header is attached to at least a portion of a block of data. The header provides instructions for transmitting, interpreting and processing the block of data. The is data is referred to as "data payload" or simply "payload." The size of the payload may vary based on size limitations established for a communication link or a communication protocol associated with the communication link. Since payload size may vary, the number of data packets needed to forward an entire block of data to another node may also vary.

Communication networks may include one or more nodes interconnected on one or more communication links. Each node may use different resources to build a data packet. For example, one node may use hardware resources to quickly generate multiple data packets. Another node may not have such hardware resources and instead may rely on software resources to build multiple data packets. Accordingly, efficiently utilizing varying node resources to build data packets is problematic in some communication networks.

BRIEF DESCRIPTION OF THE DRAWINGS

The invention is illustrated by way of example, and not by way of limitation, in the figures of the accompanying drawings in which like reference numerals refer to similar elements and in which.

DETAILED DESCRIPTION

Embodiments of the invention are generally directed to a method and apparatus to generate a data descriptor. In one embodiment, a memory includes a block of data to be forwarded from a node to another node on a communication link. A descriptor manager accesses the memory and generates a data descriptor for the block of data. The data descriptor includes an indication to build a data packet containing at least a portion of the block of data in an accelerated or a non-accelerated manner.

Figure 1:
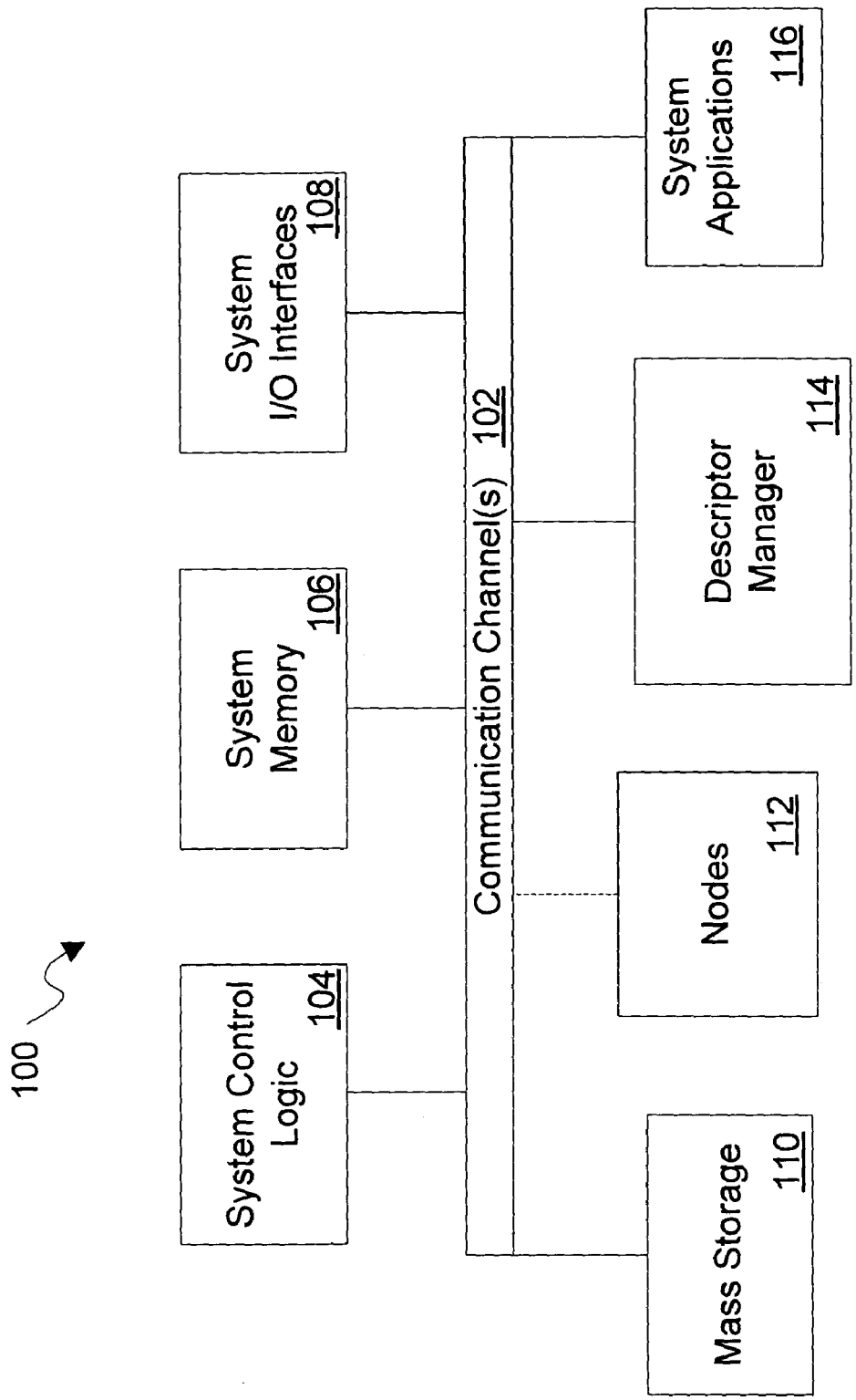
FIG. 1 is a block diagram of an electronic system, according to an one embodiment.

FIG. 1 is a block diagram of an electronic system, according to one embodiment. Electronic system 100 is depicted including system control logic 104, system memory 106, system input/output (I/O) interfaces 108, mass storage 110, nodes 112, descriptor manager 114 and system applications 116, all interconnected by communication channel(s) 102. Electronic system 100 may well be a server, a switch or a router, although the invention is not limited to these devices.

In one embodiment, system control logic 104 controls the overall operation of electronic system 100 and is intended to represent any of a wide variety of logic device(s) and/or executable content to control the operation of electronic system 100.

System memory 106 stores information such as temporary variables or intermediate information. This information may be stored during execution of instructions by system control logic 104. System memory 106 may also temporarily store blocks of data.

In an example embodiment, system memory 106 may temporarily store a block of data that is selected for forwarding by electronic system 100 to either elements within electronic system 100 (e.g., nodes 112) via communication channel(s) 102 or elements remote to electronic system 100 via system I/O interfaces 108. The blocks of data may either originate from electronic system 100 (e.g., system control logic 102 or system applications 116) or may be received by electronic system 100 via system I/O interfaces 108.

System applications 116 may provide internal instructions to system control logic 104, for example, to assist in the selection and/or forwarding of blocks of data.

Nodes 112 are elements within electronic system 100 that may serve as I/O endpoints to process blocks of data transmitted/received on a communication link. The communication link may be located within electronic system 100. For example, the communication link may link two nodes via communication channel(s) 102. The communication link may also be located externally to electronic system 100. For example, nodes 112 may act as the I/O endpoint for electronic system 100 which is linked to another I/O processing endpoint in another electronic system through system I/O interfaces 108 via a communication link.

In an example embodiment, electronic system 100 forwards a block of data to another electronic system. To forward the block of data, electronic system 100 uses nodes 112 to prepare the block of data for transmission on a communication link. This may involve the building of one or more data packets, each including a header and a payload, the payload including at least a portion of the block of data. Based, at least in part, on the resources of nodes 112, the one or more data packets are built in an accelerated or non-accelerated manner.

In an example embodiment, resources to build a data packet in an accelerated manner may include hardware such as a network processor, microcontroller, application specific integrated circuit (ASIIC), field programmable gate array (FPGA) and/or any combination thereof, although the invention is not limited in this regard.

In an example embodiment, resources to build a data packet in a non-accelerated manner are resources that are slower than the primarily hardware components that may make up resources to build a data packet in an accelerated manner. These resources may rely more on system (e.g., system applications 116) to build a data packet, although the invention is not limited in this regard.

In an example embodiment, before forwarding a block of data, electronic system 100 temporarily stores the block of data in system memory 106. System control logic 104 invokes an instance of descriptor manager 114. Descriptor manager 114, generates a data descriptor for the block of data. The data descriptor may be used by nodes 112 to build a data packet containing at least a portion of the block of data. The data descriptor also includes an indication to build the data packet in an accelerated or a non-accelerated manner.

Figure 2:
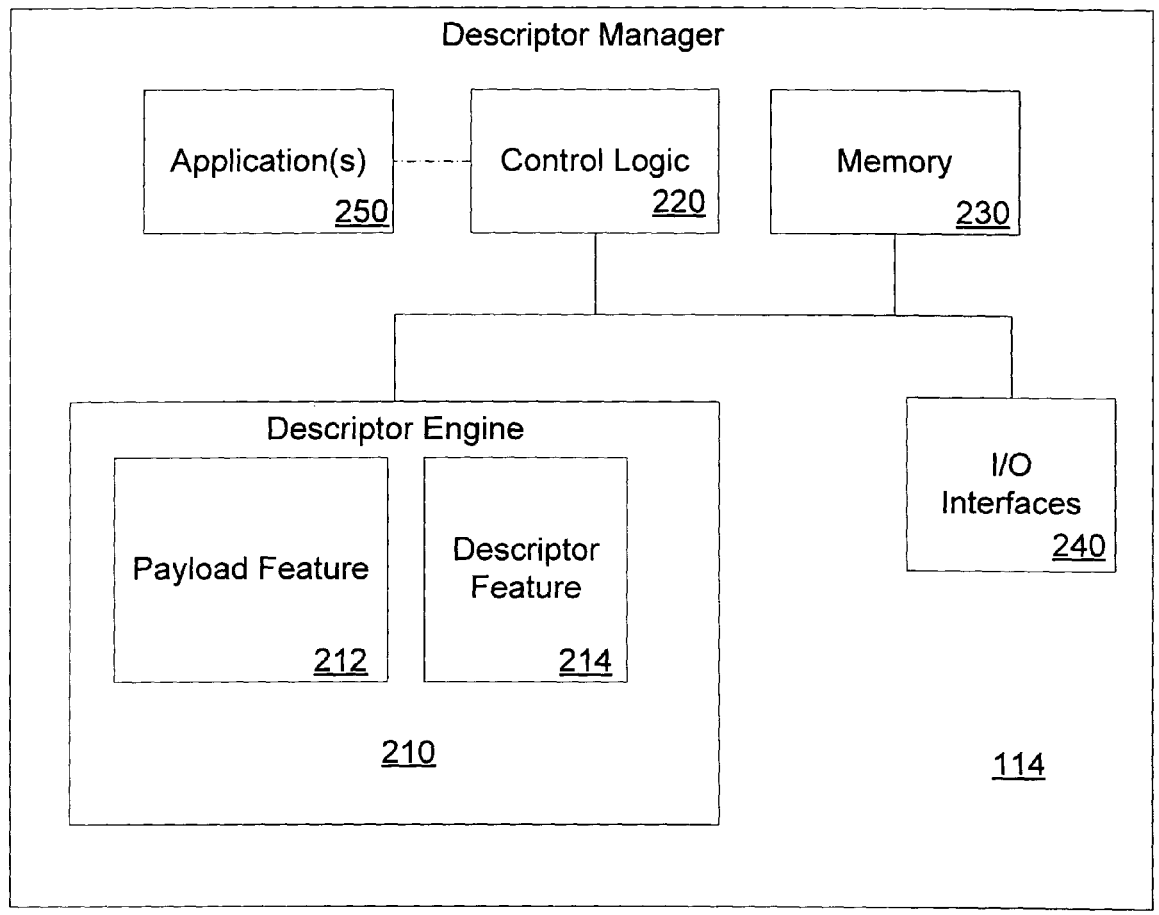
FIG. 2 is an architectural diagram of a descriptor manager, according to one embodiment.

FIG. 2 is an architectural diagram of descriptor manager 114, according to one embodiment. Descriptor manager 114 comprises a descriptor engine 210, control logic 220, memory 230, I/O interfaces 240, and optionally one or more applications 250, each coupled as depicted.

Descriptor engine 210 includes a payload feature 212, and a descriptor feature 214. As developed more fully below, these features generate a data descriptor for a block of data.

As used herein, control logic 220 controls the overall operation of descriptor manager 114 and is intended to represent any of a wide variety of logic device(s) and/or executable content to implement the control of descriptor manager 114. In alternate embodiments, the features and functionality of control logic 220 may well be implemented within descriptor engine 210.

In one embodiment, control logic 220 invokes an instance of descriptor engine 210 to generate a data descriptor for a block of data.

Memory 230 may store executable content to be used by control logic 220 to implement an instance of descriptor engine 210.

As used herein, I/O interfaces 240 provide a communications interface between elements of descriptor manager 114 and elements of electronic system 100. For example, I/O interfaces 240 provide a communications interface between control logic 220 and system applications 116. Control logic 220 can receive a series of instructions from system applications 116 via I/O interfaces 240.

In an example embodiment, descriptor manager 114 includes one or more applications 250 to provide internal instructions to control logic 220. As used herein, such applications 250 may well be invoked to generate a user interface, e.g., a graphical user interface (GUI), to enable administrative features, and the like. In alternate embodiments, one or more features of descriptor engine 210 may well be implemented by applications 250, selectively invoked by control logic 220 to invoke such features.

In an example embodiment, electronic system 100 forwards a block of data temporarily stored in system memory 106. System control logic 104 invokes an instance of descriptor manager 114. Descriptor manager 114 then invokes an instance of descriptor engine 210 to generate a data descriptor for the block of data.

Descriptor engine 210 invokes an instance of payload feature 212. Payload feature 212 initiates the generation of the data descriptor for the block of data. To do this, payload feature 212 first assesses the size of the block of data to determine whether the entire block of data fits within the data descriptor. If the block of data fits, the entire block of data is included in the data descriptor. If the block of data does not fit, payload feature 212 includes a pointer to a location in system memory 106 where the block of data is located and can be retrieved when data packets are built to forward the block of data from electronic system 100.

Once payload feature 212 has initiated the generation of the data descriptor, descriptor engine 210 invokes an instance of descriptor feature 214 to complete the generation of the data descriptor. As described in more detail below, descriptor feature 214 adds additional information to the data descriptor. This additional information includes an indication to build one or more data packets containing at least a portion of the block of data in an accelerated or non-accelerated manner.

In an example embodiment, electronic system 100 is operating in compliance with the Advanced Switching Core Architecture Specification, Rev. 1.0, published December 2003 (hereinafter referred to as "the ASI Core Specification") and available through the Advanced Switching Interconnect Special Interest Group (ASII SIG). The ASI Core Specification includes a description and criteria for supporting various transport services relating to forwarding blocks of data through a switch fabric. These transportation services may include congestion management, multicast transmissions, segmentation and reassembly (SAR), simple load store (SLS), simple queuing (SQ) and secure data transport (SDT), although the invention is not limited to these transportation services. The ASI Core Specification further associates each transportation service with a particular protocol interface or "PI".

In an example embodiment, electronic system 100 builds one or more data packets to forward a block of data. Each data packet includes specific ASI route and PI header information. The ASI route and PI header information facilitates the transportation of the data packet over a switch fabric operated in compliance with the ASI Core Specification, hereinafter deemed an "ASI fabric."

In an example embodiment, nodes 112 generates the ASI route and PI header information contained within each data packet built to forward a block of data via an ASI fabric.

Figure 3:
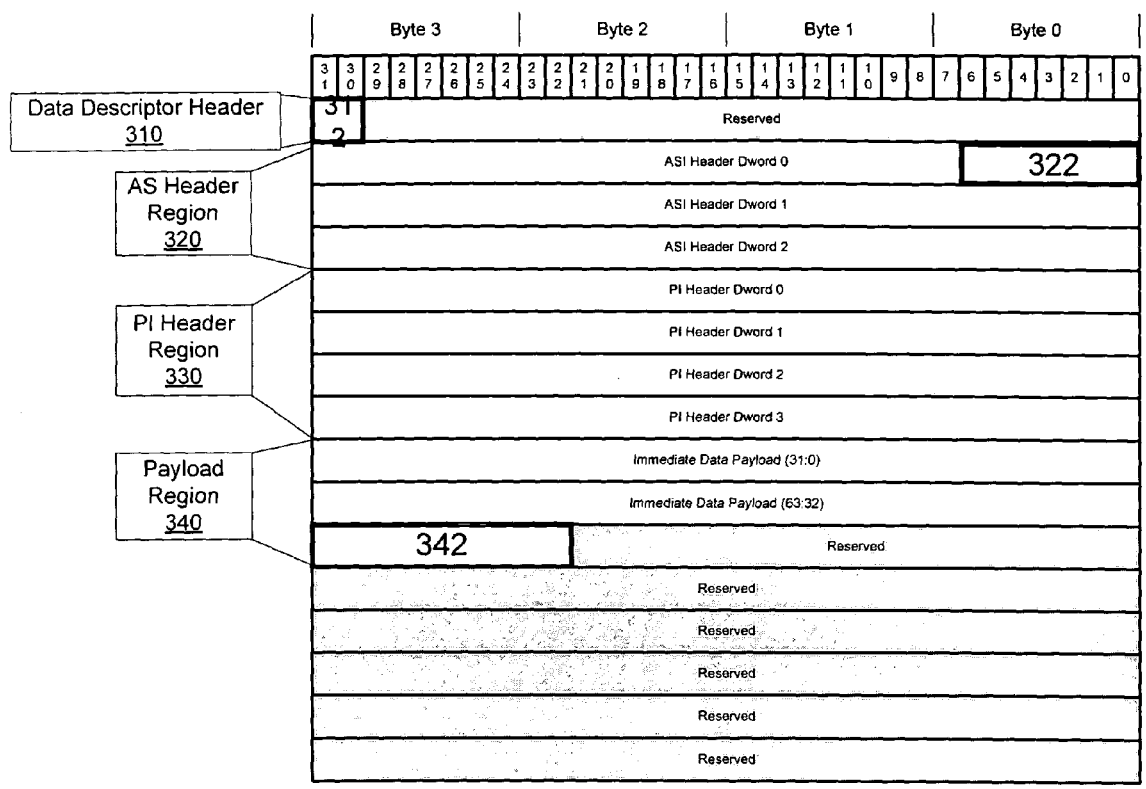
FIG. 3 is a graphical illustration of a data descriptor format (DDF), according to one embodiment.

FIG. 3 is a graphical illustration of a data descriptor format (DDF), according to one embodiment. DDF 300 is depicted as comprising a double-word format. A double-word, hereinafter referred to as a "dword," is 32 bits of data. Each dword is further divided into bytes 0-3, although the invention is not limited to this dword format.

In an example embodiment, the first dword in DDF 300 contains data descriptor header 310. Data descriptor header 310 includes a field 312 in bits 30 and 31. Bits 30 and 31, when asserted, indicate whether an entire block of data is contained within a data descriptor in the format of DDF 300 or whether at least a portion of the payload is found elsewhere (e.g. in system memory 106).

The three dwords in ASI header region 320 contain ASI header information. The information in these fields may be based, at least in part, on the routing and transportation services available to an electronic system (e.g., electronic system 100) located on an ASI fabric.

ASI header dword 0 includes a field 322 which contains bits 0-6. Field 322 indicates a PI (transportation service) used to transport a built data packet(s) over the ASI fabric.

In an example implementation, nodes 112 may include dedicated resources (e.g., an ASIC, FPGA, special function controller or processor, other hardware device and firmware or software) to build data packets to be transported using a particular PI. If nodes 112 have enabled those dedicated resources, then building a data packet using those dedicated resources is referred to as building in an accelerated manner. If those dedicated resources are not available and/or enabled, then building a data packet without those dedicated resources (e.g., using system or non-dedicated resources) is referred to as building in a non-accelerated manner. As a result, the its contained in field 322 to indicate a particular PI may also indicate building a data packet in n accelerated or non-accelerated manner.

Bits 7-31 in ASI dword 0 and all bits in ASI dwords 1 and 2 are reserved for other types of ASI information. This information facilitates the routing and transportation of the data packets on the ASI fabric.

The four dwords in PI header region 330 include dwords that contain information related to transportation services for data packets forwarded on the ASI fabric.

Payload region 330 consists of three dwords. The first two dwords contain either the entire block of data or contain a physical memory address pointer to where the block of data is stored (e.g., in system memory 106). Thus, for example, these dwords may contain up to 8 bytes of the block of data or up to an 8-byte (64-bit) address pointer, although the invention is not limited in this regard.

The third dword in payload region 340 includes a field 342 which contains bits 22-31. Field 342 indicates a unique identifier that serves as a tag to track the progress of building data packets to forward the block of data.

Bits 0-21 of the third dword in payload region 340 and the twelfth through sixteenth dwords of PDF 300 are reserved.

Figure 4:
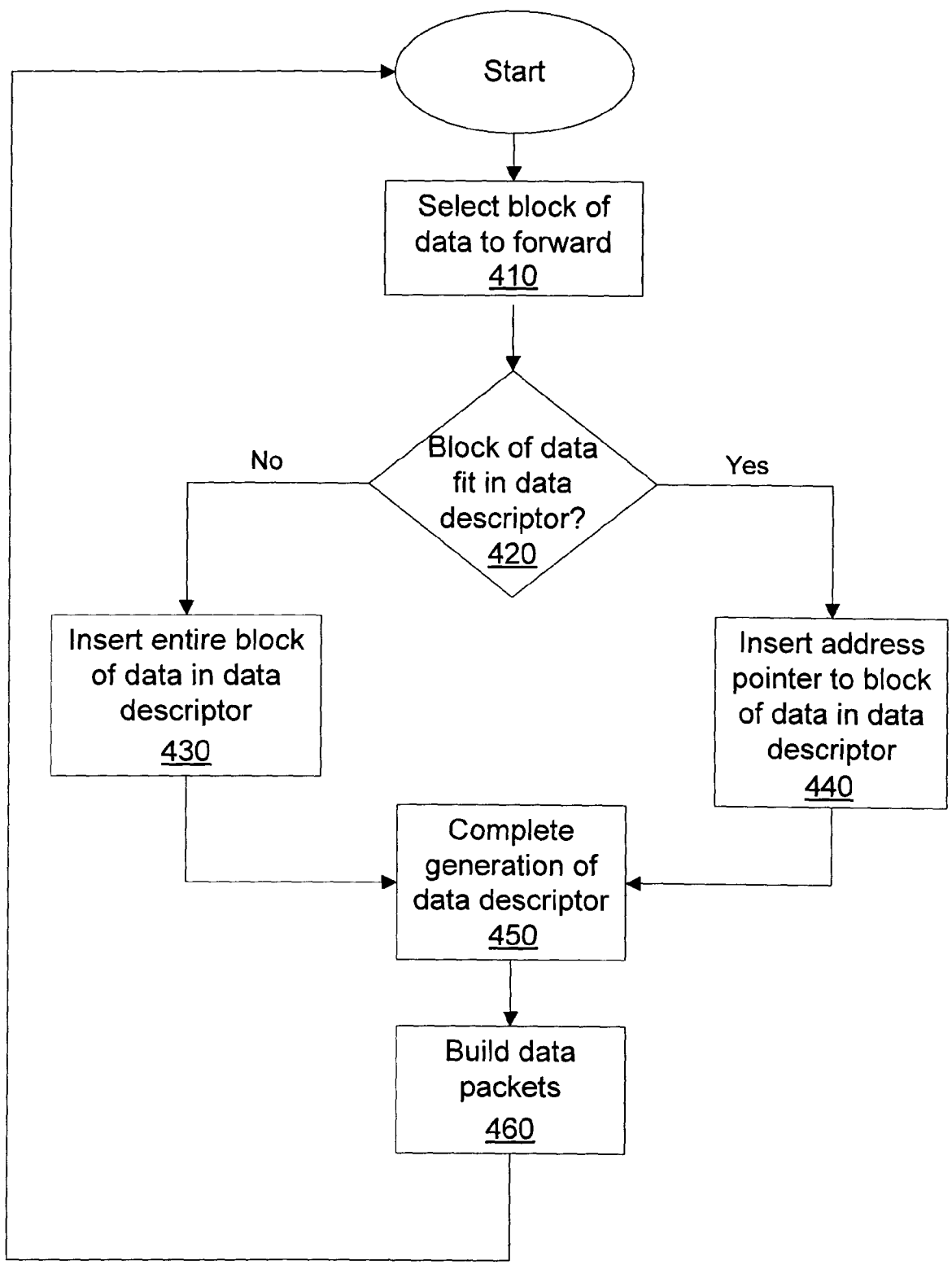
FIG. 4 is a flow chart of a method to generate a data descriptor, according to one embodiment.

FIG. 4 is a flow chart of a method to generate a data descriptor, according to one embodiment. In block 410, according to an example embodiment, electronic system 100 selects a block of data for forwarding to another electronic system via an ASI fabric. The block of data is temporarily stored in a system memory 106. Once the block of data is stored, the process then moves to block 420.

In block 420, system control logic 104 invokes an instance of descriptor manager 114 to generate a data descriptor for the block of data. As a result, descriptor engine 210 invokes an instance of payload feature 212 to initiate generation of the data descriptor for the block of data. Payload feature 212 first assesses the size of the block of data to determine whether the block of data will fit within a data descriptor in the format of DDF 300 (e.g., is 8 bytes or less). If payload feature 212 determines that the data block fits within the data descriptor, the process moves to block 430.

In block 430, payload feature 212 inserts the entire block of data in the first two dwords of payload region 340. Payload feature 212 then de-asserts bits 30 and 31 in field 312 to indicate that the entire payload is contained within the data descriptor. The process then moves to block 450.

If payload feature 212 determines that the block of data does not fit within the data descriptor, the process moves to block 440. In block 440, payload feature 212 inserts an address pointer in the first two dwords of payload region 340. The address pointer indicates a physical location in system memory 106 where the block of data is located. Payload feature 212 then asserts bits 30 and 31 in field 312 to indicate that the data descriptor contains an address pointer to where the block of data is located. The process then moves to block 450.

In block 450, descriptor engine 210 invokes an instance of descriptor feature 214 to complete the generation of the data descriptor for the block of data. Descriptor feature 214 retrieves information pertaining to the ASI header and the PI header regions of the data descriptor (e.g., maintained in system memory 106). Since electronic system 100 is on an ASI fabric, this information is related to the transportation and routing of one or more data packets containing at least a portion of the block of data. Accordingly, descriptor feature 214 inserts the retrieved information in the ASI and PI header region of the data descriptor.

Descriptor feature 214 also asserts the bits in field 342 to create an identifier to serve as a tag to track the progress of building data packets to forward the block of data. Once the above mentioned fields of the data descriptor are selectively asserted, descriptor feature 214 then transmits the data descriptor (e.g., in a data descriptor packet) via communication channel(s) 102 to nodes 112, the process then moves to block 460.

In block 460, nodes 112 receive the data descriptor for the block of data. Nodes 112, based on the bits asserted in field 312 of the data descriptor, locate the block of data either in system memory 106 (bits 31 and 30 de-asserted) or within the data descriptor (bits 31 and 30 asserted).

Nodes 112 then read field 322 of the data descriptor to determine whether the data descriptor indicates building a data packet in an accelerated or non-accelerated manner. In an example implementation, if nodes 112 include and have enabled the dedicated resources associated with a PI indicated in field 322, then the data packet is built in an accelerated manner. If nodes 112 do not have the dedicated resources or they are not enabled, the data packet is built in a non-accelerated manner.

In an example embodiment, nodes 112, with the assistance of a non-dedicated resource (e.g., system applications 116), builds a data packet in a non-accelerated manner. This non-accelerated manner includes concatenating at least a portion of the information contained in the data descriptor. The information that is concatenated is the information in ASI header region 320, PI header region 330 and payload region 340. Once the above parts of the data descriptor are concatenated, the data packet is built.

If the block of data is of a size such that when added to the payload of a data packet, the data packet exceeds size limitations for forwarding data on the ASI fabric, nodes 112's resources may build multiple data packets. Each data packet may contain at least a portion of the block of data. Field 342 of the data descriptor is used to track the progress of building each data packet. The process then starts over for the next block of data to be forwarded by electronic system 100.

The functions of system control logic 104, nodes 112, descriptor manager 114 and control logic 220, as described above, may well be implemented in hardware, software, firmware, or any combination thereof. In this regard, system control logic 104, nodes 112, descriptor manager 114 and control logic 220 may well be implemented as one or more of an ASIC, FPGA, special function controller or processor, other hardware device and firmware or software to perform at least the functions described herein.

System memory 106 and memory 230 may well include a wide variety of memory media including but not limited to volatile memory, non-volatile memory, flash, programmable variables or states, random access memory (RAM), read-only memory (ROM), or other static or dynamic storage media.

In accordance with one example embodiment, machine-readable instructions can be provided to system memory 106 and/or memory 230 from a form of machine-accessible medium. As used herein, a machine-accessible medium is intended to represent any mechanism that provides (i.e., stores and/or transmits) information in a form readable by a machine (e.g., electronic system 100). For example, a machine-accessible medium may well include: ROM; RAM; magnetic disk storage media; optical storage media; flash memory devices; electrical, optical, acoustical or other form of propagated signals (e.g., carrier waves, infrared signals, digital signals); and the like. Instructions may also be provided to system memory 106 via a remote connection through system I/O interfaces 108.

In an example embodiment, system I/O interfaces 108 enables one or more element(s), e.g., system control logic 104, to interact with input and/or output devices, for example, a mouse, keyboard, touchpad, cathode ray tube monitor, liquid crystal display, etc.

In the previous descriptions, for the purpose of explanation, numerous specific details were set forth in order to provide a thorough understanding of the invention. It will be apparent, however, to one skilled in the art, that the invention can be practiced without these specific details. In other instances, structures and devices were shown in block diagram form in order to avoid obscuring the invention.

References made in the specification to "one embodiment" or "an embodiment" means that a particular feature, structure or characteristic described in connection with that embodiment is included in at least one embodiment of the invention. Thus, the appearances of the phrase "in one embodiment" appearing in various places throughout the specification are not necessarily all referring to the same embodiment. Likewise, the appearances of the phrase "in another embodiment," or "in an alternate embodiment" appearing in various places throughout the specification are not all necessarily referring to the same embodiment.

In accordance with one example embodiment, machine-readable instructions can be provided to system memory 106 and/or memory 230 from a form of machine-accessible medium. As used herein, a machine-accessible medium is intended to represent any mechanism that provides (i.e., stores and/or transmits) information in a form readable by a machine (e.g., electronic system 100). For example, a machine-accessible medium may well include: ROM; RAM; magnetic disk storage media; optical storage media; flash memory devices; electrical, optical, acoustical, and the like. Instructions may also be provided to system memory 106 via a remote connection through system I/O interfaces 108.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative of, rather than limiting the scope and coverage of the claims appended hereto.

What is claimed is:

1. A method comprising:
    generating a data descriptor for a block of data to be forwarded from a node to another node on a communication link, wherein the data descriptor includes an indication to build a data packet containing at least a portion of the block of data in an accelerated or a non-accelerated manner and wherein one or more elements, other than the node or the other node, on the communication link are to build the data packet based on the generated data descriptor, wherein the data descriptor is to be built by a descriptor manger, the descriptor manager comprising a payload feature to assess a size of the block of data to determine whether the entire block of data fits within the data descriptor, wherein to build a data packet in the accelerated manner comprises using a dedicated resource, responsive to the one or more elements, to generate switching route and protocol interface headers for a built data packet, and wherein to build a data packet in the non-accelerated manner comprises using a non-dedicated resource, responsive to the one or more elements, to generate switching route and protocol interface headers for the built data packet.

2. A method according to claim 1, wherein the block of data is stored in a memory, the data descriptor containing an address pointer to the stored block of data, at least a portion of the block of data to be added to a built data packet.

3. A method according to claim 1, wherein the entire block of data is contained within the data descriptor.

4. A method according to claim 1, wherein the data descriptor includes an identifier to track the progress of a built data packet.

5. The method of claim 1, further comprising the payload feature including a pointer to a location in a system memory where the block of data is located and is to be retrieved in response to a determination that the entire block of data will not fit within the data descriptor.

6. The method of claim 1, wherein the descriptor manager is to comprise a descriptor feature to complete generation of the data descriptor by adding the indication to build the data packet containing at least the portion of the block of data in the accelerated or the non-accelerated manner.

7. The method of claim 1, wherein the switching route header comprises an advanced switching route header.

8. An apparatus comprising:
    a memory including a block of data to be forwarded from a node to another node on a communication link; and
    a descriptor manager to access the memory and generate a data descriptor for the block of data, wherein the data descriptor includes an indication to build a data packet containing at least a portion of the block of data in an accelerated or a non-accelerated manner, wherein one or more elements, other than the node or the other node, on the communication link are to build the data packet based on the generated data descriptor, the descriptor manager comprising a payload feature to assess a size of the block of data to determine whether the entire block of data fits within the data descriptor, wherein a data packet is to be built in the accelerated manner by using a dedicated resource, responsive to the one or more elements, to generate switching route and protocol interface headers for a built data packet, and wherein a data packet is to be built in the non-accelerated manner by using a non-dedicated resource, responsive to the one or more elements, to generate switching route and protocol interface headers for the built data packet.

9. An apparatus according to claim 8, the apparatus further comprising:
    the memory to store executable content; and
    a control logic, communicatively coupled with the memory, to execute the executable content, to implement an instance of the descriptor manager.

10. An apparatus according to claim 9, wherein the control logic comprises control logic implemented in a network processor.

11. The apparatus of claim 8, wherein the switching route header comprises an advanced switching route header.

12. A system comprising:
    a node;
    a volatile memory including a block of data to be forwarded from the node to another node on a communication link; and
    a descriptor manager to access the volatile memory and generate a data descriptor for the block of data, wherein the data descriptor includes an indication to build a data packet containing at least a portion of the block of data in an accelerated or a non-accelerated manner, wherein one or more elements, other than the node or the other node, on the communication link are to build the data packet based on the generated data descriptor, the descriptor manager comprising a payload feature to assess a size of the block of data to determine whether the entire block of data fits within the data descriptor, wherein a data packet is to be built in the accelerated manner by using a dedicated resource, responsive to the one or more elements, to generate switching route and protocol interface headers for a built data packet, and wherein a data packet is to be built in the non-accelerated manner by using a non-dedicated resource, responsive to the one or more elements, to generate switching route and protocol interface headers for the built data packet.

13. A system according to claim 12, wherein the node is responsive to a switch fabric in a communication network.

14. A system according to claim 13, wherein the switch fabric is operated in compliance with the Advanced Switching Core Specification.

15. The system of claim 12, wherein the switching route header comprises an advanced switching route header.

16. A storage device storing content, which, when executed by a node, causes the node to:
generate a data descriptor for a block of data to be forwarded from a node to another node on a communication link, wherein the data descriptor includes an indication to build a data packet containing at least a portion of the block of data in an accelerated or a non-accelerated manner, wherein one or more elements, other than the node or the other node, on the communication link are to build the data packet based on the generated data descriptor, wherein the data descriptor is to be built by a descriptor manger, the descriptor manager comprising a payload feature to assess a size of the block of data to determine whether the entire block of data fits within the date descriptor, wherein to build a data packet in the accelerated manner comprises using a dedicated resource, responsive to the one or more elements, to generate switching route and protocol interface headers for a built data packet, and wherein to build a data packet in the non-accelerated manner comprises using a non-dedicated resource, responsive to the one or more elements, to generate switching route and protocol interface headers for the built data packet.

17. A storage device according to claim 16, wherein the block of data is stored in a memory, the data descriptor containing an address pointer to the stored block of data, at least a portion of the block of data to be added to a built data packet.

18. A storage device according to claim 16, wherein the entire block of data is contained within the data descriptor.

19. The storage device according to claim 16, wherein the switching route header comprises an advanced switching route header.

* * * * *

UNITED STATES PATENT AND TRADEMARK OFFICE
CERTIFICATE OF CORRECTION

| | | |
|---|---|---|
| PATENT NO. | : 7,831,747 B2 | Page 1 of 1 |
| APPLICATION NO. | : 11/008338 | |
| DATED | : November 9, 2010 | |
| INVENTOR(S) | : Jim Bury et al. | |

It is certified that error appears in the above-identified patent and that said Letters Patent is hereby corrected as shown below:

In column 10, line 2, in claim 16, delete "date" and insert -- data --, therefor.

Signed and Sealed this
Twenty-second Day of February, 2011

David J. Kappos
*Director of the United States Patent and Trademark Office*